(No Model.)

I. B. TAYLOR.
ANIMAL GUARD.

No. 587,466. Patented Aug. 3, 1897.

Witnesses:

Inventor
I. B. Taylor
By James J. Sheehy
Attorney

UNITED STATES PATENT OFFICE.

ISAAC B. TAYLOR, OF ELLENSBURG, WASHINGTON, ASSIGNOR OF ONE-HALF TO S. T. PACKWOOD, OF SAME PLACE.

ANIMAL-GUARD.

SPECIFICATION forming part of Letters Patent No. 587,466, dated August 3, 1897.

Application filed May 15, 1896. Serial No. 591,650. (No model.)

*To all whom it may concern:*

Be it known that I, ISAAC B. TAYLOR, a citizen of the United States, residing at Ellensburg, in the county of Kittitas and State of Washington, have invented certain new and useful Improvements in Animal-Guards; and I do declare the following to be a full, clear, and exact description of the invention, such as will enable others skilled in the art to which it appertains to make and use the same.

My invention relates to improvements in devices for preventing live stock from passing through wire fences, and its novelty and advantages will be fully understood from the following description and claim when taken in conjunction with the annexed drawings, in which—

Figure 1:
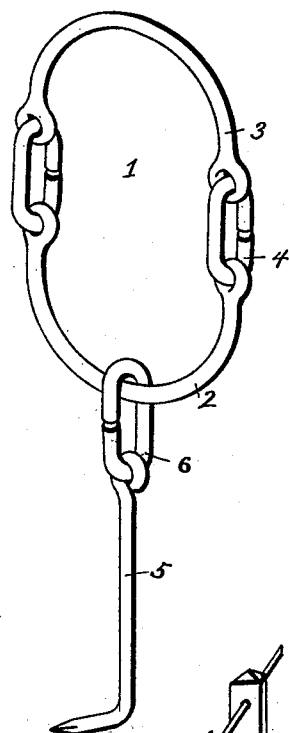
Figure 2:
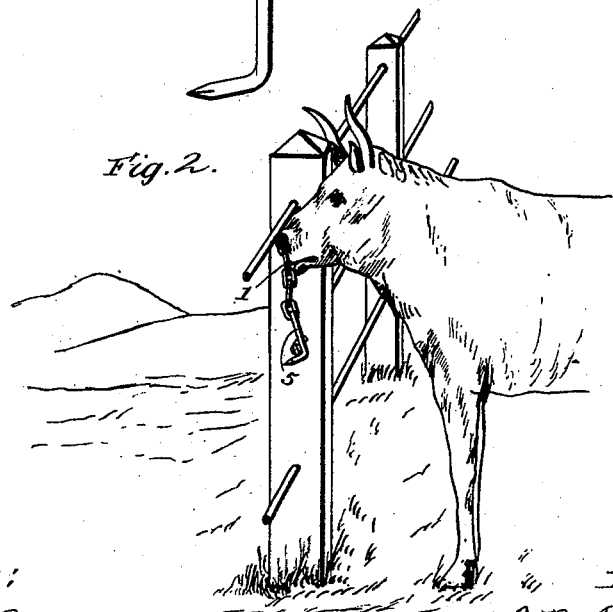

Figure 1 is a perspective view of my improved device, and Fig. 2 is a view illustrative of the manner in which the device operates to prevent stock from passing through wire fences.

Referring by numerals to the said drawings, 1 indicates the loop or ring of my improved device, which is preferably formed of steel, although it may be formed of any other suitable metal. This loop or ring 1, which is of sufficient size to receive the lower portion of the animal's muzzle and is designed to be secured in its nose, comprises the lower curvilinear section 2, which has eyes at its opposite ends, the upper curvilinear section 3, which also has eyes at its ends, and the links 4, which engage the eyes of the sections 2 and 3 and effect a loose connection of the said sections for a purpose presently described.

5 indicates the hook of the device, which is provided at one end with an eye for the loose reception of the link 6, the said link loosely receiving the lower section 2 of the loop or ring 1, as shown, so as to permit free movement of the hook in various directions.

In connecting my improved device to an animal's nose the upper section 3, which is previously connected to one of the links 4, is passed through the cartilage between the nostrils and is then connected to the other link 4 in the manner shown. When this is done, it will be seen that the loop or ring 1 will depend from the animal's nose and loosely receive the lower portion of its muzzle, so as not to interfere with its grazing or eating, and it will also be seen that the hook 5 will loosely depend below the animal's chin. In virtue of this when the animal attempts to pass between the runner-wires of a wire fence the hook 5 will engage or catch on one of the wires, as shown in Fig. 2, and any further movement of the animal's head through the fence will, by reason of the loop or ring 1 being secured in its nose, cause it pain and compel it to desist in its efforts to get through the fence and will thereby prevent damage to the fence, which is an important advantage.

As will be readily appreciated, the peculiar construction of the ring or loop 1 is highly desirable for the reason that it permits the lower section 2, link 6, and hook 5 to swing freely beneath the animal's chin without transmitting such movement to the upper section 3 and thereby prevents chafing of the animal's nose, in which the said section 3 is secured, as before described, which is an important advantage. It will also be observed that when the animal puts its head to the ground to graze the links 4, loosely connecting the sections 2 3, will enable the loop or ring to flex at its middle, and will also enable the said section 2, together with the link 6 and hook 5, to lie flat upon the ground, so as to permit of the animal eating in comfort and without interference.

The peculiar loose connection of the hook 5 with the lower section 2 of the loop or ring 1 is desirable, because it enables the hook 5 to assume and retain a pendent position ready to engage the runner-wire of a fence, no matter in which direction the animal moves its head.

Having described my invention, what I claim is—

The device described for preventing animals from passing through wire fences consisting essentially of the loop or ring 1, adapted to be secured in the animal's nose and loosely receive the lower portion of its muzzle and formed by the lower and upper sections 2, 3, provided with eyes at their ends and the links engaging the eyes and loosely connecting the said sections, the hook having an eye at its upper end and the link engaging said eye of the hook and loosely receiving the lower section 2, of the loop or ring, substantially as and for the purpose set forth.

In testimony whereof I affix my signature in presence of two witnesses.

ISAAC B. TAYLOR.

Witnesses:
C. H. STEWART,
ERNEST I. ANDERSON.